United States Patent

[11] 3,631,782

[72] Inventor John H. Eagle
 Rochester, N.Y.
[21] Appl. No. 781,364
[22] Filed Dec. 5, 1968
[45] Patented Jan. 4, 1972
[73] Assignee Eastman Kodak Company
 Rochester, N.Y.

[54] FILM CARTRIDGE HAVING A LENS APERTURE STOP
 7 Claims, 3 Drawing Figs.
[52] U.S. Cl. ........................................................ 95/31 CA
[51] Int. Cl. ...................................................... G03b17/26,
 G03b 7/00
[50] Field of Search ........................................... 95/31, 19,
 34; 352/72, 78

[56] References Cited
UNITED STATES PATENTS
1,595,997  8/1926  Cocanari ..................... 352/78 X
 706,245  8/1902  Louden ....................... 95/31
FOREIGN PATENTS
 450,201  7/1936  Great Britain ............... 95/31

Primary Examiner—Samuel S. Matthews
Assistant Examiner—Russell E. Adams, Jr.
Attorneys—Robert W. Hampton and William F. Delaney, Jr.

ABSTRACT: A film cartridge provided with means defining an aperture stop for determining the exposure aperture of cameras in which the cartridge is adapted for use. Cartridges according to the invention are of particular utility in cameras of the type having a fixed exposure aperture and a single shutter speed for reducing the effective size of the exposure aperture of the camera in accordance with the speed of the film contained in the cartridge.

INVENTOR
JOHN H. EAGLE

BY William F. Delany Jr.
RW Hampton

ATTORNEY

FILM CARTRIDGE HAVING A LENS APERTURE STOP

BACKGROUND OF THE INVENTION

The present invention relates to photographic film cartridges adapted for use in motion picture or still cameras.

Many cameras of the type designed to accept film cartridges are provided with means for adjusting shutter speed and relative aperture to compensate for film speed and/or provide different exposure conditions. These adjusting means are often manual, and require the camera operator to physically adjust a camera component to control the exposure parameters. Such devices are not entirely satisfactory because the camera operator frequently fails to make the necessary adjustment. To simplify camera operation, automatic control means are sometimes provided to adjust the exposure parameters in response to a code indication on a film cartridge when the cartridge is positioned in the camera. For example, such a cartridge and cooperating exposure control system are disclosed in U.S. Pat. No. 3,260,182 which issued July 12, 1966 in the name of Hubert Nerwin. The code indication is indicative of film speed and type, and the automatic control means may be adapted to adjust the shutter speed, the relative aperture, or the sensitivity of an exposure meter, etc., or any combination thereof. Cameras incorporating such exposure-adjusting systems tend to be expensive, regardless whether the adjustment is manual or automatic, since a plurality of precision made moving parts are generally required.

In order that cartridge cameras can be made available at low cost, many of them do not include an exposure control system. Many such cameras have but a single shutter speed and a fixed exposure aperture. Although they are inexpensive they suffer the inherent disadvantage of not being adjustable for different film speeds and thus must be used with a specific scene brightness and/or type of film; i.e., film having a speed which is compatible with fixed exposure parameters of the camera. Should the photographer load his camera with a film incompatible with these fixed exposure parameters, improperly exposed photographs will probably result.

SUMMARY OF THE INVENTION

An object of this invention is to provide a simple and inexpensive film cartridge having means for determining the exposure aperture in a camera in which the cartridge is adapted for use.

According to the present invention a film cartridge adapted for use in a camera is provided with means defining an aperture stop for determining the effective exposure aperture of the camera according to the speed of film in the cartridge. This invention permits film contained in a cartridge to be properly exposed in a camera which is not equipped with means for adjusting exposure parameters to compensate for film speed. Thus, simple cartridge cameras not having exposure control systems can be used with a variety of film types and speeds.

DESCRIPTION OF PREFERRED EMBODIMENTS

Figures 1, 2, 3:
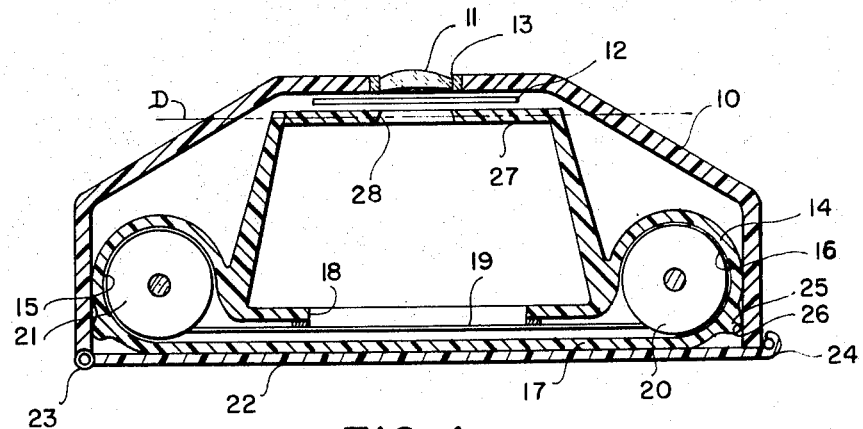
FIG. 1 is a sectional view of a film cartridge according to the invention in a camera adapted to receive the cartridge.
FIG. 2 is a sectional view of a film cartridge according to another embodiment of the invention forming a portion of the housing of a camera in which the cartridge is located.
FIG. 3 is a fragmentary sectional view similar to FIG. 1 showing portions of a camera and cartridge according to another embodiment of the invention.

One embodiment of a film cartridge according to the invention is shown in FIG. 1 in a still camera having a housing 10 in which is located an objective lens 11 for forming an image in an image plane, a shutter 12, a fixed exposure aperture 13, and a film-winding means (not shown). The objective lens 11 is a positive meniscus element concave to the image side, and it defines a diaphragm plane D on the image side of the lens.

Every lens system has a limiting aperture which is usually defined by an aperture stop or by the clear aperture of the lens. The limiting aperture of a camera objective is referred to herein as the exposure aperture of the camera, and it is usually expressed in terms of relative aperture, defined as the focal length of the objective divided by the diameter of its entrance pupil which is the image of the limiting or exposure aperture viewed from the image side of the lens. This limiting or exposure aperture is a controlling factor in the brightness of an image formed by the optical system. The exposure aperture of the camera in the FIG. 1 embodiment is defined by the mount 13 which determines the clear aperture of the lens 11, since the camera does not include an aperture stop.

The film cartridge in FIG. 1 preferably comprises a molded plastic housing 14 forming a film supply chamber 15, a takeup chamber 16, and a film guide portion 17 defining a framing aperture 18 between the chambers. The film guide portion 17 is adapted to support a portion of film 19 to be exposed in a flat plane behind the cartridge-framing aperture 18 which may be considered analogous to a field stop as distinguished from an aperture stop. A takeup spool 20 is located in the takeup chamber 16, to which film 19 from a supply roll 21 in the supply chamber is attached. When the cartridge is loaded in the camera as shown, a door 22 mounted by hinges 23 on the housing 10 is held closed by a latch 24 to make the camera lighttight, and the takeup spool 20 is engaged for rotation by the film-winding means (not shown) of the camera to advance film from the supply roll past the exposure opening onto the takeup spool. The position of the cartridge in the camera is determined in the disclosed embodiments 25 by detents on the cartridge which interlock with cooperating grooves 26 formed on the inner surface of the camera housing 10. When the cartridge is so positioned, the portion of the film 19 located behind the framing aperture 18 is substantially in the image plane of the objective lens 11, so that an image is formed by objective 11 on a portion of the film 19 through the exposure aperture 13 when the shutter 12 is opened.

The luminance incident on the film during an exposure is determined by the scene illumination, the shutter speed and the exposure aperture. Cameras with fixed exposure parameters are usually adapted for one specific film speed for taking pictures in a specified range of scene luminance which usually requires well-lighted objects or scenes. Therefore, if the operator should use a film having a speed different than is specified for such a camera, an image of a well-lighted scene will be overexposed.

According to this invention, however, the film cartridge in FIG. 1 is provided with an integral extension 27 of the cartridge housing in front of the framing aperture 18 of the cartridge. The extension 27 defines an aperture 28 which is adapted to be located in or near the diaphragm plane D of the objective lens 11 to form an aperture stop which reduces the exposure aperture of the camera.

The correct relative aperture of a camera objective for any set of exposure conditions can be determined from the standard exposure equation, $A^2T=BS/K$, wherein $A$ represents the f/number of the objective lens 11, $T$ represents exposure time in seconds, $B$ represents scene luminance in foot-lamberts, $S$ represents ASA film speed, and $K$ represents an exposure constant which is determined through subjective tests. Since the f/number or relative aperture is the ratio of lens focal length to the diameter of the entrance pupil of the lens, the diameter of the stop 28 may be determined by the ASA film speed of the film 19 in the cartridge, the shutter speed of the camera for which the cartridge is adapted, the most probable scene luminance, and the location of the stop with respect to the diaphragm plane of the lens. For example, if a cartridge contains film having an ASA speed of four times that contained by another cartridge, the former cartridge would require a stop associated therewith having a diameter one-half that of the aperture associated with the latter cartridge in order for the exposure at the film plane to produce a similar exposure of the film in the same camera with the same scene luminance, assuming the stops were located in the diaphragm plane of the objective.

Although the stop 28 is preferably located in the diaphragm plane D of the objective lens, it can be positioned elsewhere along the optical axis, as long as it reduces the size of the axial light beam transmitted through the camera lens and exposure aperture parallel to the axis so that the effective relative aperture of the lens is reduced or limited by the stop. However, a stop displaced from the diaphragm plane has less effect on the relative aperture of the system and causes vignetting. Accordingly, it is preferred that a camera adapted to receive cartridges according to this invention be provided with an objective lens having its diaphragm plane behind the lens, where it is convenient to locate the stop of the cartridge.

It is assumed in the embodiment shown in FIG. 1 that the photographer will always encounter the same normal range of scene luminance. In such a situation, it is necessary to reduce the quantity of light striking the film when a fast film is utilized. However, the operator may also purposely select a film having a fast speed because he desires to photograph a scene having a low scene luminance. For such an application the embodiments shown in FIGS. 2 and 3 are preferred, since those cartridges are provided with means defining a stop which can be selectively adjusted to vary the aperture size of the stop to adapt the cartridge for exposures in an increased range of scene luminance.

In the FIG. 2 embodiment of the invention, the cartridge 14 is provided with a movable diaphragm vane 30 positioned over the aperture stop 28. The diaphragm vane 30 may comprise a movable plate having a plurality of different size apertures or a single tapered aperture, so that movement of the diaphragm vane across the lens 11 varies the exposure aperture. The diaphragm vane 30 can be adapted for movement to a set position prior to insertion of the cartridge in the camera, or as seen in FIG. 2 the vane can be provided with a movable control arm 31 adapted to extend through an opening 32 in the camera housing 10, which permits adjustment of the diaphragm vane position while the cartridge is in the camera.

The cartridge 14 shown in FIG. 2 serves the additional function of providing a back for the camera. With the cartridge held in position in the camera by the detents 25 on the cartridge which interlock with the cooperating grooves 26 formed in the inner surface of camera housing 10, the cartridge is adapted to form with the camera a lighttight chamber. Insertion and removal of the cartridge may be effected by exerting pressure on a flexible flange 29 of the camera in the direction of the arrow.

In the FIG. 3 embodiment of the invention one or more (three are shown) supplemental aperture plates 33 may be positioned on the extension 27 over the stop 28 of the cartridge in a stacked formation. Each plate 33 has an aperture 34, and the plates are so arranged that each of the apertures 34 is axially aligned with the lens 11 and of the stop 28. The apertures 34 progressively differ in size, for example by equal one stop increments, from the smallest sized aperture 34 in the uppermost plate to the largest aperture 34 is the lowermost plate which, in turn, has a smaller aperture than stop 27.

The range of scene luminance which can be accommodated by film in a cartridge according to the FIG. 3 embodiment of the invention is extended toward a lower light level. For example, assume the normal luminance range of daylight subjects varies from 125 to 2,000 foot-lamberts. This range encompasses scene luminance varying from open shade through "sun on snow" and corresponds to a four stop change in light level. Since most films have an exposure latitude of at least plus or minus two stops, such a range in scene luminance can be adequately accommodated by one stop size. Therefore, if three supplemental aperture plates are stacked one upon the other as shown, and each plate has an aperture one stop larger than the aperture of the plate above it, and the uppermost aperture is designed to accommodate the normal 125 to 2,000 foot-lamberts range, then the lowermost aperture (i.e. one having an aperture three stops larger than the uppermost aperture) would provide a proper exposure for a scene luminance range varying from 15 to 250 foot-lamberts.

The supplemental aperture plates may be suitably supported on the cartridge using various techniques. Preferably they are formed from an opaque flexible material, one side of which is coated with a layer 35 of adhesive material. Thus, if the operator desires to photograph a dimly lighted scene, he simply peels off a number of aperture plates until he reaches an aperture which is suited to the level of scene luminance to be encountered. The cartridge is then inserted into the camera and film is advanced in the usual manner.

The invention has been described in detail with particular reference to preferred embodiments thereof, but it will be understood that variations and modifications can be effected within the spirit and scope of the invention as described hereinabove and as defined in the appended claims.

I claim:

1. A film cartridge adapted for use in a camera having an objective lens for forming images in an image plane, said film cartridge comprising: means for supporting film in the image plane when the cartridge is positioned in the camera, and means defining an aperture stop between the lens and the image plane when the cartridge is loaded in the camera for restricting the luminance of an image formed in the image plane by the objective.

2. A film cartridge adapted for use in a camera having an objective lens for forming images in an image plane, the objective defining a diaphragm plane between the lens and image plane, said film cartridge comprising means defining an aperture stop substantially in the diaphragm plane in axial alignment with the optical axis of the lens to define the relative aperture of the objective lens when the cartridge is loaded in the camera.

3. A film cartridge adapted for use in a camera having an objective lens for forming an image in an image plane, the objective defining a diaphragm plane on the image side of the lens, said film cartridge comprising means for supporting film in the image plane when the cartridge is positioned in the camera, and means defining an aperture stop between the image plane and the lens substantially in the diaphragm plane for determining the relative exposure aperture of the objective lens when the cartridge is positioned in the camera.

4. In combination with a camera adapted to receive a film cartridge and having an objective lens for forming an image in an image plane and means defining an exposure aperture determining the maximum relative aperture of the lens, a film cartridge comprising means defining an aperture stop between the lens and the image plane in axial alignment with the optical axis of the lens when the cartridge is positioned in the camera, said stop defining a relative aperture smaller than the maximum relative aperture.

5. A film cartridge adapted for use in a camera having means defining an exposure aperture adapted to transmit light to a film plane to make photographic exposures, said film cartridge comprising means for supporting film in the film plane and means defining an aperture stop aligned with exposure aperture and between said exposure aperture and the film plane when the cartridge is loaded in the camera for reducing the brightness of light transmitted to film in the film plane, said stop defining means comprising a plurality of aperture members each having an aperture formed therein of a size different from that found in each of the other aperture members, the members being arranged in a stack with the apertures in said members in alignment with one another, to enable the size of said aperture stop to be varied by selective removal of said aperture members.

6. In combination with a camera adapted to receive a film cartridge and having an objective lens for forming an image in an image plane, a film cartridge adapted to be positioned in the camera to support film in the image plane and having means defining an aperture stop between the lens and the image plane for determining the relative exposure aperture of the objective lens when the cartridge is positioned in the camera, said aperture stop defining means comprising a diaphragm vane having at least one exposure aperture adapted for movement with respect to the optical axis of the objective to vary the relative exposure aperture of the objective.

7. The combination claimed in claim 6 wherein the diaphragm vane is provided with control means operable exteriorly of the camera to vary the relative aperture of the objective lens.

* * * * *

PO-1050
(5/69)

UNITED STATES PATENT OFFICE
CERTIFICATE OF CORRECTION

Patent No. 3,631,782      Dated January 4, 1972

Inventor(s) John H. Eagle

It is certified that error appears in the above-identified patent and that said Letters Patent are hereby corrected as shown below:

Column 4, Line 62

Delete "found" and insert --formed--

Signed and sealed this 30th day of May 1972.

(SEAL)
Attest:

EDWARD M.FLETCHER,JR.
Attesting Officer

ROBERT GOTTSCHALK
Commissioner of Patents